May 19, 1970      G. D. HAJEK      3,513,376
HIGH VOLTAGE TO LOW VOLTAGE REGULATED INVERTER APPARATUS
Filed Nov. 29, 1967
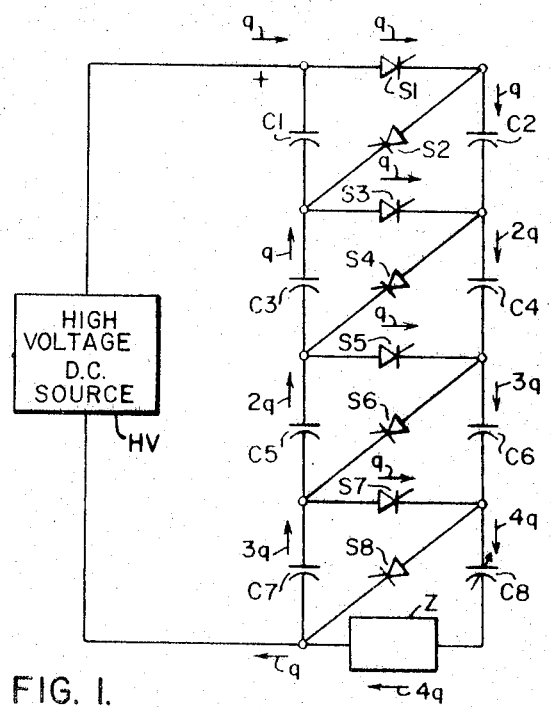
FIG. 1.
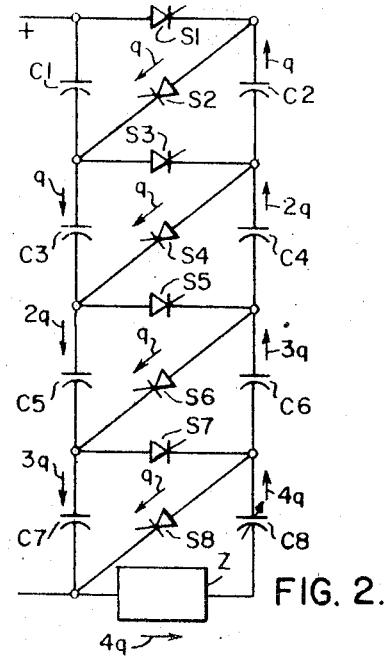
FIG. 2.
FIG. 3.
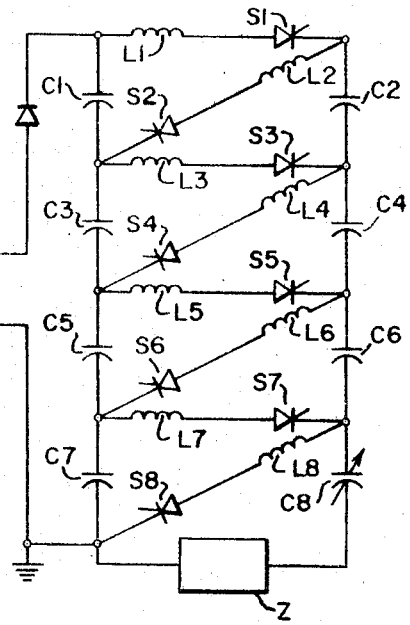
FIG. 4.
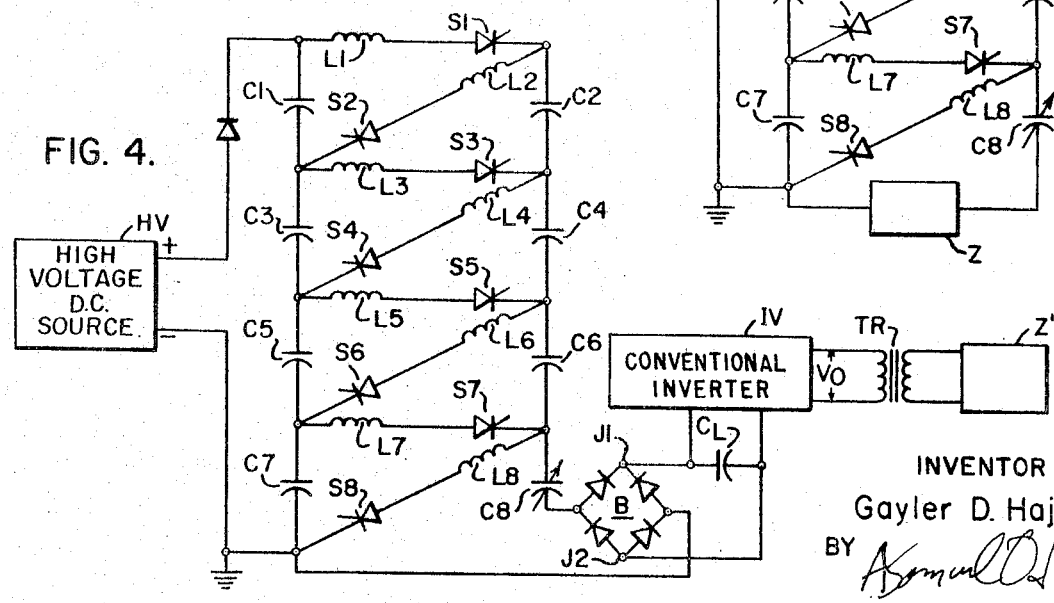
INVENTOR
Gayler D. Hajek
BY
ATTORNEY

United States Patent Office 3,513,376
Patented May 19, 1970

3,513,376
HIGH VOLTAGE TO LOW VOLTAGE REGULATED INVERTER APPARATUS
Gayler D. Hajek, Greensburg, Pa., assignor to Westinghouse Electric Corporation, Pittsburgh, Pa., a corporation of Pennsylvania
Filed Nov. 29, 1967, Ser. No. 686,514
Int. Cl. H02m 7/00
U.S. Cl. 321—15                                    2 Claims

ABSTRACT OF THE DISCLOSURE

The present disclosure relates to a method and apparatus for inverting high voltage DC to low voltage high current AC or DC. A plurality of inverter stages are utilized with each stage including capacitive and switching elements. The switching elements are selectively operative to transfer charge between the capacitive elements of the various stages. The plurality of stages are tandemly connected across a high voltage DC source with a load being connected in series with a variable capacitor in the last stage of the plurality. The variable capacitor may be adjusted to regulate the voltage appearing in the load circuit to within desired regulated limits. The variable capacitor also protects the various circuit components from overvoltage conditions which may exist at startup of the inverter apparatus, and also prevents overdamping in the inverter when a resonant charging technique is used.

Cross reference to related application

The present application is related to copending application Ser. No. 684,256, filed Nov. 20, 1967, by Peter Mylnar and assigned to the same assignee as the present application, and is an improvement thereon.

Background of the invention

The present invention relates to inverter apparatus and methods of inverting and, more particularly, to inverter apparatus and methods of inverting for inverting high voltage direct current to lower voltage and higher inverting current levels with the output voltage being regulated.

In the above cited copending application, a highly unique converter system is taught for converting high voltage DC to lower voltage and higher current levels. A very advantageous use of such an inverter system is for tapping relatively small quantities of power from a high voltage DC transmission line for local utilization along the DC transmission system. The inverter system utilizes a plurality of inverter stages each stage including switching and capacitive elements with the plurality of stages being connected in tandem across a high voltage DC source. The load for the inverter system is connected in the last stage of the plurality of stages and is thereby connected in series with the various capacitors of the inverter network.

Various types of switching elements are taught in the cited copending application including gate controlled switches and transistors which have a gate turnoff capability once rendered conductive. Also taught is the use of such devices as silicon controlled rectifiers and reverse switching rectifiers which do not have a gate turnoff capability and which must be turned off by reducing the current flow therethrough to substantially zero current. In the copending application, a resonant charging or turnoff technique is described wherein inductive elements are placed in series with the various switching elements so that a resonant circuit is set up with the capacitive elements of the various stages. This causes a substantially half wave sinusoidal current waveform to appear through the various switching devices. As this sinusoidal waveform goes to zero, due to the resonant circuit conditions, the current tries to reverse itself and thereby applies a reverse voltage across the switching elements thereby turning off the previously conductive devices. Since the load is in series with the various capacitors which are being charged and discharged during the inverting operation, the magnitude of this load becomes important in regards to the resonant operation of the circuitry. Hence, as the resistance component of the load circuit increases, the resonant circuits will become increasingly damped and will reach a point of overdamping when the resistance becomes sufficiently large. In the case of overdamping, the current will not tend to reverse itself and hence no reverse bias will be applied across the switching elements and they will not be commutated off. This becomes disastrous if the previously off switching elements are turned on since a short circuit will exist across the high voltage sourse to ground.

In many applications, it is highly desirable that the output voltage developed at the output of the inverter be regulated to hold the output voltage within defined limits. This is particularly important when the output voltage is utilized to supply a conventional inverter which is provided to further process the voltage, current and frequency of the high voltage to low voltage inverter. The voltage developed at output of the inverter is dependent upon the quantity of charge deposited during a cycle of operation. This quantity of charge is dependent upon the magnitude of the load impedance, and, hence, if the load impedance changes so will the quantity of charge deposited during a cycle, and in response thereto the output voltage will also change. Thus, in order to provide a regulated output voltage for the inverter, it becomes necessary that compensatory means be provided in the inverter system in order to adjust for changes in load impedance so that a substantially constant output voltage is provided by the inverter.

Summary of the invention

Broadly, the present invention provides inverter apparatus and methods for converting high voltage DC to lower voltage levels at high current levels wherein a plurality of inverter stages are utilized each including capacitive and switching elements. The plurality of stages are operatively connected across the high voltage source. A load circuit is connected in the last stage of the plurality of stages. A variable capacitive element is connected in series with the load and is adjustable to various capacitive values. Switching elements of each stage are selectively controlled to transfer charge between the capacitive elements so as to provide increased current flow through the load at an increased current level with the capacitive element connected in series with the load being adjustable to provide voltage regulation and to select the resonant charging frequency to insure commutation of the switching devices.

Brief description of the drawing

FIGS. 1 and 2 are schematic diagrams of one embodiment of the present invention;
FIG. 3 is a schematic diagram of another embodiment of the present invention; and
FIG. 4 is a schematic diagram of another embodiment.

Description of the preferred embodiments

The term "switching element" will be utilized herein to designate various elements and devices which are operative in a switching mode to open or close a circuit. Among the various switching elements which may be used herein are: mechanical switches, silicon controlled rectifiers (SCR), gate control switches (GCS), transistors and reverse switching rectifiers (RSR). However, it should be understood that the other equivalent switching elements, mechanically or electrically controlled can be utilized in the various embodiments hereinafter to be described.

The term "odd switching elements" will be used herein to designate the group of switching elements S1, S3, S5, S7 . . . , and the term "even switching elements," will be used to designate the group of switching elements S2, S4, S6, S8 . . . . The term "odd capacitors" will be used to designate the group of capacitors C1, C3, C5, C7 . . . , and the term "even capacitors" will be used to designate the group of capacitors C2, C4, C6, C8 . . . .

Referring now to FIGS. 1 and 2, a first embodiment of the present invention will be described with the switching element used therein being the gate controlled switch. As is well known, the GCS is a gate controlled device which may be turned on or off by the application of a pulse of the proper polarity to the gate electrode thereof. The application of a positive polarity pulse to the gate with respect to the cathode of the device permits the conduction of current from anode to cathode thereof. The application of a negative polarity pulse to the gate with respect to the cathode will block the conduction of current from anode to cathode thus turning off the device.

In FIGS. 1 and 2, a high voltage DC source is indicated by a block HV. The high voltage DC source HV supplies a DC voltage having a positive polarity at the positive line +, the other output being connected to a reference potential such as ground. In a practical utilization of the present invention, the high voltage DC source may be supplied from a high voltage DC transmission system. As shown in FIGS. 1 and 2, the inverter includes four inverter stages; however, various numbers of stages can be utilized depending upon degree of voltage division and current multiplication desired. The first inverter stage includes capacitors C1 and C2 and switching elements S1 and S2. The second, third and fourth stages include, respectively, capacitors C3, C4 and switching elements S3, S4; capacitors C5, C6 and switching elements S5, S6 and capacitors C7, C8 and switching elements S7, S8. The odd capacitors are thus connected across the high voltage DC source HV. The even capacitors are connected in series to a load impedance Z, which is returned to the DC source HV. The load impedance may include resistive and reactive components. It should be noted that the capacitor C8 in the last stage of the inverter is a variable capacitor which may be adjusted to various capacitive values and which is directly connected in series with the load impedance Z and thus carries the same current as the load impedance Z.

FIGS. 1 and 2 illustrate the steady-stage conditions of the inverter for respective half cycles of the operation thereof. With the system in a steady-state of operation, assume that two units of charge 2Q are supplied by the high voltage source HV and also assume each of the capacitors C1 through C7 has the same capacitance value. Also assume that the variable capacitor C8 has been adjusted to be at the same capacitance value. Under these conditions each of the odd capacitors and each of the even capacitors will receive a unit charge Q. Due to the transfer of charge within the same inverter stage and from a higher inverter stage to a lower inverter stage, there will be various incremental changes in the charge levels. This is indicated by the letter $q$ in FIGS. 1 and 2, with the incremental changes occurring during the respective half cycles as shown in FIGS. 1 and 2. Thus, there will either be one increment $q$, two increments $2q$, three increments $3q$, or four increments $4q$ being transferred to or from a given capacitor of the various stage during a given half cycle of operation.

During the first half cycle of steady state operation, all of the odd switching elements are turned on and all of the even switching elements are turned off as illustrated in FIG. 1. During the second half cycle, all of the even switching elements are turned on and all of the odd switching elements are turned off as illustrated in FIG. 2.

Considering a typical incremental charge $q'$ and tracing this incremental charge $q'$ through the various stages as shown in FIGS. 1 and 2, during the first half cycle, when the odd switching elements are turned on, charge incremental $q'$ is transferred from the source HV at the capacitor C1 through the element S1 to the capacitor C2. During the next half cycle, as shown in FIG. 2, with the even switching elements being turned on, the charge increment $q'$ is transferred from the capacitor C2 through the switching element S2 to the capacitor C3 of the next lower stage. During the next half cycle the odd switches are turned on with the charge increment $q'$ being transferred from the capacitors C3 through the switching element S3 to the capacitor C4 of the same stage. The charge increment $q'$ is transferred from the capacitor C4 through the switching element S4 to the capacitor C5 during the next half cycle with the even switching elements being turned on. During subsequent switching cycles, the charge increment $q'$ is transferred from the capacitor C5 through the switching element S5 to the capacitor C6; from the capacitor C6 through the switching elements S6 to the capacitor C7; from the capacitor C7 through switching element S7 to the capacitor C8 from the capacitor C8 through the switching element S8 and back to the source HV. Thus, the incremental charge $q'$ travels from the high voltage source through the various inverter stage, through the load and back to the supply source. Each time an increment of charge moves from one capacitor to the next it looses potential energy. As can be seen in FIGS. 1 and 2, four increments of charge $4q$ are moved to lower potential levels during each half cycle of the inverter operation. This results in current multiplication through the load Z and voltage reduction appearing thereacross.

This can be seen in FIG. 1 when during the first half cycle, the capacitor C8 has transferred thereto four increments to charge $4q$ which is also transferred through the load Z. The next half cycle, illustrated in FIG. 2, four charge increments, $4q$, are supplied to the load Z and the capacitor C8, with one increment of charge $q$ being applied through the switch S8 and three increments of charge $3q$ being transferred from the capacitor C7. During each cycle of operation, one charge increment $q$ is supplied from the source HV and is returned thereto as shown in FIG. 1, while the load Z sees a charge of four increments $4q$ of charge due to the current multiplication effect of the four inverter stages. The average input current is thus:

$$Iin(AV) = \frac{q}{T}$$

where $q$ is a fixed quantity of change and T is the period of one cycle. The average output current may be defined by:

$$IL(AV) = \frac{4q}{T/2} = \frac{8q}{T}$$

Therefore:

$$IL(AV) = 8 \, Iin(AV)$$

Hence, the average input current is multiplied by a factor of 8. The average output voltage is divided by a factor of 8 in order to maintain input and output power constant. Reference is made to the above copending application for further details of operation of the inverter when the capacitor C8 is fixed and equal to the other capacitors in the network.

Voltage regulation of the output voltage across the load impedance Z can be effected by the adjustment of the variable capacitor C8. Adjustment of the capacitor C8 is necessary in order to provide voltage regulation across the load impedance Z since if the load impedance Z varies so will the voltage thereacross. Thus, for example, if the load impedance should increase, the magnitude of charge transferred from capacitor C8 through the load Z will decrease thereby increasing the voltage across the load impedance Z since this voltage is directly proportional to the quantity of charge on the capacitor. Conversely if the magnitude of the load impedance should decrease, the charge lost by the capacitor will increase thereby decreasing the voltage across the load impedance. If it is desired to maintain the voltage constant across the load, it is necessary that the ratio of quantity of charge to capacitance be maintained constant. Thus, if the quantity of charge decreases due to an increase in the load impedance, the capacitance must be decreased by adjusting the variable capacitor C8 so as to decrease a corresponding amount to hold the voltage constant. If the load impedance should be reduced, thereby increasing the quantity of charge, the capacity of the capacitor C8 would be adjusted to provide a higher capacitance in proportion to the increases in quantity or charge so as to maintain the voltage constant. The output voltage may thus be controlled by varying the capacitor C8 which regulates the quantity of charge deposited on the capacitor per cycle and thereby determines the output voltage. It should be noted that the variable capacitor C8 is connected in the last stage of the plurality of inverter stages and hence a relatively low voltage appears thereacross thereby eliminating insulation problems which might otherwise be serious. Moreover, the use of capacitor C8 for regulation is inherently efficient since it does not involve utilization of any dissipative elements.

Referring now to FIG. 3, another embodiment of the present invention is shown wherein another advantage of the utilization of the variable capacitor C8 is demonstrated. In the inverter of FIG. 3, silicon controlled rectifiers are utilized as the switching elements for the transfer of charge between the various capacitors. Unlike gate controlled switches and transistors, silicon controlled rectifiers do not have a turn-off capability. That is, once anode to cathode current is conducted by the device, in order for the device to terminate conduction, the anode-cathode current must be reduced to substantially zero. This is accomplished in the circuitry of FIG. 3 by a resonant charging technique. In FIG. 3, inductors L1 through L8 are connected, respectively, in series with the respective controlled rectifiers S1 through S8. Also a diode D1 is connected between the plus line of the high voltage source HV and the top end of the capacitor C1. The function of the diode D1 is to prevent reverse voltages higher than the high voltage source voltage from being applied in a reverse direction to the high voltage DC source HV.

During the first half cycle of operation, the odd controlled rectifiers are turned on permitting the passage of current therethrough. Due to the presence of the inductor L1 in series with the controlled rectifier S1, the current waveform passing through the controlled rectifier S1 will be substantially a sinusoidal half wave rectified waveform. Inductor L1 causes the current to increase and then begin to decrease as the incremental charge $q$ is transferred to the capacitor C2 via the inductor L1 and switch element S1. At a time toward the end of the half cycle, the current through the switch S1 will have substantially gone to zero. However, because of the reactive elements as seen by the current through the controlled rectifier S1, a resonant condition will be set up with the inductor L1 being selected to resonate with the inverter capacitors C1, C2 and any other associated capacitors including the variable capacitor C8. This resonant condition will cause the current through the switch S1 and the inductor L1 to tend to reverse directions. This will reverse the voltage appearing across the controlled rectifier S1 thereby causing a reverse bias voltage to be applied across the device causing it to turn-off.

Since the load impedance Z is in the resonant charging circuit, the magnitude of the resistive component thereof will determine the amount of damping seen in the resonant circuit which effects turn-off of the various controlled rectifiers. The capacitor C8 being connected directly in series with load impedance Z will also determine the resonant charging frequency since it sees the entire load current. Thus, by decreasing the value of the capacitor C8, the resonant charging frequency can be increased thereby reducing the conduction time of the controlled rectifiers as compared to the off time. Conversely, by increasing the capacitance value of the variable capacitor C8, the resonant charging frequency can be decreased to increase the ratio of conduction time to off time of the various controlled rectifiers.

The use of the variable capacitor C8 provides the important advantage of permitting use of various load impedances Z having relatively large resistive components without overdamping the resonant circuits and thereby prohibiting the reverse turn-off voltage from being applied across the various controlled rectifiers. The equation for the critical damping resistance is:

$$R_{CR} = 2\sqrt{\frac{L}{C}}$$

From this equation is evident that as the capacitance value C is decreased the value of the critical resistance $R_{CR}$ is increased for a constant in distance L. Thus, increasingly high values of load resistances may be utilized in the circuitry as shown in FIG. 3 by decreasing the value of the variable capacitor C8 to insure that the value of the load resistance is less than the critical damping value.

The operation of the inverter of FIG. 3 is identical to that of the embodiments of FIGS. 1 and 2. However, the value of the variable capacitor C8 is adjusted according to the value of the resistive component of the load impedance Z to insure that less than a critical damping resistance is seen in the resonant charging circuit for each of the controlled rectifiers. Hence, during the first half cycle of operation, the odd controlled rectifiers are turned on and then are turned off by resonant charging effect as the voltage reverses across each of the controlled rectifiers. After the odd controlled rectifiers are turned off, the even controlled rectifiers are turned on and the same resonant charging takes place with the current through each of the controlled rectifiers having a substantially half sinusoidal waveform. As the current through each of the devices goes to zero, a reverse bias voltage is applied across the even switching elements due to the resonant circuitry including the load impedance and the variable capacitor C8 and they are turned off. The output current appearing through the load impedance Z will have a substantially sinusoidal waveform for the positive and negative half cycles. Reference is made to the cited copending application for further discussion of the resonant turnoff operation of such inverter circuitry using switching elements not having a gate turnoff characteristic.

FIG. 4 is another embodiment of the present invention wherein load impedance Z as shown in FIG. 3 is shown as including a diode bridge full-wave rectifier B, and output capacitor CL, a conventional inverter IV, a transformer TR and an output load ZL. The rectifier bridge circuit B includes four diodes converted in a standard full wave rectifier array. The input of the bridge circuit B is connected between the bottom end of the variable capacitor C8 and ground, and the output is taken from the bridge across the junctions J1 and J2 with the capacitor CL connected thereacross. The input to the conventional inverter IV is taken from across the capacitor CL, with the output of the inverter IV being applied to the primary of the transformer TR. The secondary of the transformer TR is connected across the load impedance ZL.

The alternating output current of the high voltage to low voltage inverter is applied to the input of the rectifier bridge B and is rectified therein so that a unidirectional current appears at the output of the bridge B which is applied to the capacitor CL. Thus, a direct voltage, however, at a much reduced voltage level as compared to the high voltage DC source HV, is supplied as the operating voltage for the inverter IV. Because of the greatly reduced voltage appearing at the output stage of the high voltage to low voltage inverter as applied to the diode bridge B the conventional inverter may be of a standard design well known in the art for inverting DC to AC at high efficiency. Moreover, the conventional inverter IV may be selected to provide a normal line frequency of 60 Hz. for supplying the load ZL. As previously mentioned the frequency of operation of the inverter apparatus receiving the high voltage DC may be quite high due to the resonant charging effect and be in the order of 10 kHz. Thus, the relatively high frequency output of the high voltage to low voltage inverter on being applied to the diode bridge B is rectified to provide low voltage DC which is ideal for supplying the conventional inverter IV. The inverter IV in response to the low voltage input DC inverts this to the normal line frequency 60 Hz. output to supply the load ZL via the transformer TR.

Because of the use of the conventional inverter IV, it becomes important that the input voltage thereto across the capacitor CL be held substantially constant independent of variations of the total load. If, for example, the load is increased and no other compensation is made in the circuitry, the voltage across the capacitor CL will drop since during each cycle of operation a smaller than desired quantity of charge will be deposited on the capacitor CL. The voltage drop across the capacitor CL will thereby effect the operation of the conventional inverter IV. Conversely if the load should decrease the quantity of charge per cycle as received by the capacitor CL will increase thereby increasing the voltage thereof and similarly effecting the operation of the conventional inverter IV.

However, by the use of the variable capacitor C8 as shown in FIG. 4 regulation of the voltage as developed across this capacitor CL can be provided. Hence, if the load increases, thereby tending to decrease the voltage across CL, the capacitive value of the capacitor C8 is increased to permit a greater quantity of charge per cycle to be applied to the capacitor CL thereby increasing its voltage to the desired value. Conversely, if the load should decrease and the voltage across the capacitor CL would tend to increase, the capacitive value of the variable capacitor C8 is decreased thereby reducing the quantity of charge per cycle applied to the output capacitor CL and thereby reducing the voltage thereacross to the desired value. Thus, through the adjustment of the variable capacitor C8 in response to changes in the load level regulation can be provided to insure the proper operation of the conventional inverter IV and the desired line frequency output being supplied to the load ZL.

In summary, the use of the variable capacitor C8 in each of the embodiments in FIGS. 1, 2, 3 and 4 permits voltage regulation at the output of the inverter by adjusting the variable capacitor to compensate for changes in the load impedance. In addition, the use of the variable capacitor C8 in the embodiments of FIGS. 3 and 4 permits the use of the resonant charge and turn-off technique for the controlled rectifiers as shown therein by maintaining the resistance as seen by the resonant charging circuits to below the critical damping resistance value.

Although the present invention has been described with a certain degree of particularity, it should be understood that the present disclosure has been made only by way of example and that numerous changes in the details of construction and the combination and arrangement of parts, elements and components can be resorted to without departing from the spirit and scope of the present invention.

I claim as my invention:
1. In an inverter system for converting high voltage DC from an input source to low voltage to be supplied to a load, the combination of:
 a plurality of inverter stages operatively connected across said input source to supply increased current to said load connected in the last of said stages at a reduced voltage than said input source, each of said stages including,
 first and second capacitance means,
 first and second switching elements, and
 inductance means connected in series with each of said first and second switching elements to provide a resonant circuit for current flow through said switching elements so that these switching elements are reverse biased and turned off after a predetermined time after conduction,
 said first capacitance means of each of said stages operatively connected in series across said input source,
 said second capacitance means of each of said stages operatively connected in series,
 one of said second capacitance means comprising a variable capacitor connected in the last stage of said plurality of stages directly in series with said load to control the quantity of charge transferred to said load by the adjustment of said variable capacitor,
 said variable capacitor being adjusted to select the resonant charging frequency of the resonant circuit and to insure that the resonant circuit is not over damped.
2. A method of converting high voltage DC to low voltage comprising the steps of:
 providing charge from a high voltage DC source,
 storing charge on a plurality of capacitive elements, one of said plurality of capacitive elements comprising a variable capacitive element,
 transferring charge between said capacitive elements from a higher to a lower potential level in a timed sequence,
 setting up a resonant condition with said capacitive elements to terminate the transfer of charge after a predetermined time,
 applying the accumulated transfer of charge to a load so that current multiplication and voltage division is effected at said load, and
 adjusting said variable capacitive element to control the quantity of charge transferred to said load and to insure said resonant condition exists.

References Cited

UNITED STATES PATENTS

| | | | |
|---|---|---|---|
| 3,418,555 | 12/1968 | Jöckel | 321—15 |
| 2,467,744 | 4/1949 | Harris | 321—15 XR |
| 2,701,310 | 2/1955 | Hulst | 321—15 XR |
| 2,219,292 | 10/1940 | Bouwers | 321—15 |
| 2,256,859 | 9/1941 | Bouwers | 321—15 XR |

WILLIAM M. SHOOP, JR., Primary Examiner

U.S. Cl. X.R.
307—110; 321—27